United States Patent
D'Errico et al.

[11] Patent Number: 5,618,863
[45] Date of Patent: Apr. 8, 1997

[54] UV STABLE POLYVINYL BUTYRAL SHEET

[75] Inventors: John J. D'Errico, Glastonbury, Conn.; Mary S. Krach, Longmeadow, Mass.

[73] Assignee: Monsanto Company, St. Louis, Mo.

[21] Appl. No.: 621,856

[22] Filed: Mar. 25, 1996

[51] Int. Cl.⁶ ........................................ C08K 5/34
[52] U.S. Cl. ................................. 524/91; 524/400
[58] Field of Search ............................ 524/91, 400

[56] References Cited

U.S. PATENT DOCUMENTS

| | | | |
|---|---|---|---|
| 3,441,361 | 4/1969 | Tocatlian | 8/506 |
| 3,823,113 | 7/1974 | Reisman | 524/91 |
| 4,952,457 | 8/1990 | Cartier et al. | 428/425 |

FOREIGN PATENT DOCUMENTS

| | | |
|---|---|---|
| 22152 | 1/1990 | Japan. |
| 77332 | 3/1992 | Japan. |
| 202031 | 7/1992 | Japan. |
| 202032 | 3/1993 | Japan. |

OTHER PUBLICATIONS

Tinuvin 328 Ultraviolet Light Absorber For Plastics and Coatings, Ciba Geigy Sales Brochure.

Tinuvin 571 Ultraviolet Light Stabilizer, 1991, Ciba Geigy Sales Brochure.

*Primary Examiner*—Kriellion S. Morgan
*Attorney, Agent, or Firm*—Fitzpatrick, Cella Harper & Scinto

[57] ABSTRACT

Polyvinyl butyral sheet for laminated safety glass containing multivalent, preferably divalent, metal salt and a UV-stabilizing amount of a benzotriazole-based compound of the formula

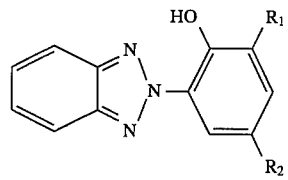

wherein $R_1$ denotes $CH_3$, linear or branched $C_5$ alkyl or linear or branched $C_{12}$ alkyl and $R_2$ denotes $CH_3$ or linear or branched $C_5$ alkyl.

5 Claims, 2 Drawing Sheets

UV STABLE POLYVINYL BUTYRAL SHEET

BACKGROUND OF THE INVENTION

This invention relates to polyvinyl butyral (PVB) sheet used with glass in safety laminates.

PVB sheet is widely used in association with one or more layers of glass in a laminate for architectural windows, automobile windshields, skylights and the like. The interlayer sheet may chemically degrade, discolor or fade when the glass laminate in use is exposed to ultraviolet (UV) rays from sunlight over an extended period. UV absorber is usually in the sheet formulation to prevent or minimize this.

Moisture on the order of up to about 2 weight percent of the sheet can be absorbed from a hot, humid environment during preparation of the glass laminate or later in use around the exposed sheet edge. This is undesirable since it causes delamination from the glass around the border of the laminate.

Adhesion control agent (ACA) in the sheet formulation controls adhesion of the sheet to glass to provide energy absorption on impact of the glass laminate. Though suitable for this, some ACA's result in zero adhesion at high interlayer moisture levels. Multivalentmetal salts of organic monocarboxylic acids control such adhesion and are desirably relatively insensitive to sheet moisture absorption. Unfortunately, the present inventors found that multivalent metal salts in PVB sheet adversely affect its UV stability even in the presence of certain UV absorbers.

SUMMARY OF THE INVENTION

Now improvements have been made in the capability of PVB sheet to resist exposure to UV light.

Accordingly, the principal object of this invention is to provide UV stability in PVB sheet containing multivalent metal carboxylic acid salt as ACA.

Other objects will in part be obvious and will in part appear from the following description and claims.

These and other objects are accomplished by providing polyvinyl butyral sheet containing multivalent metal salt and a UV stabilizing amount of a benzotriazole-based compound having the formula:

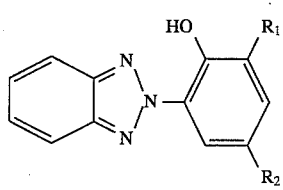

wherein $R_1$ denotes $CH_3$, linear or branched $C_5$ alkyl or linear or branched $C_{12}$ alkyl and $R_2$ denotes $CH_3$ or linear or branched $C_5$ alkyl.

DETAILED DESCRIPTION OF THE DRAWING

Figure 1:
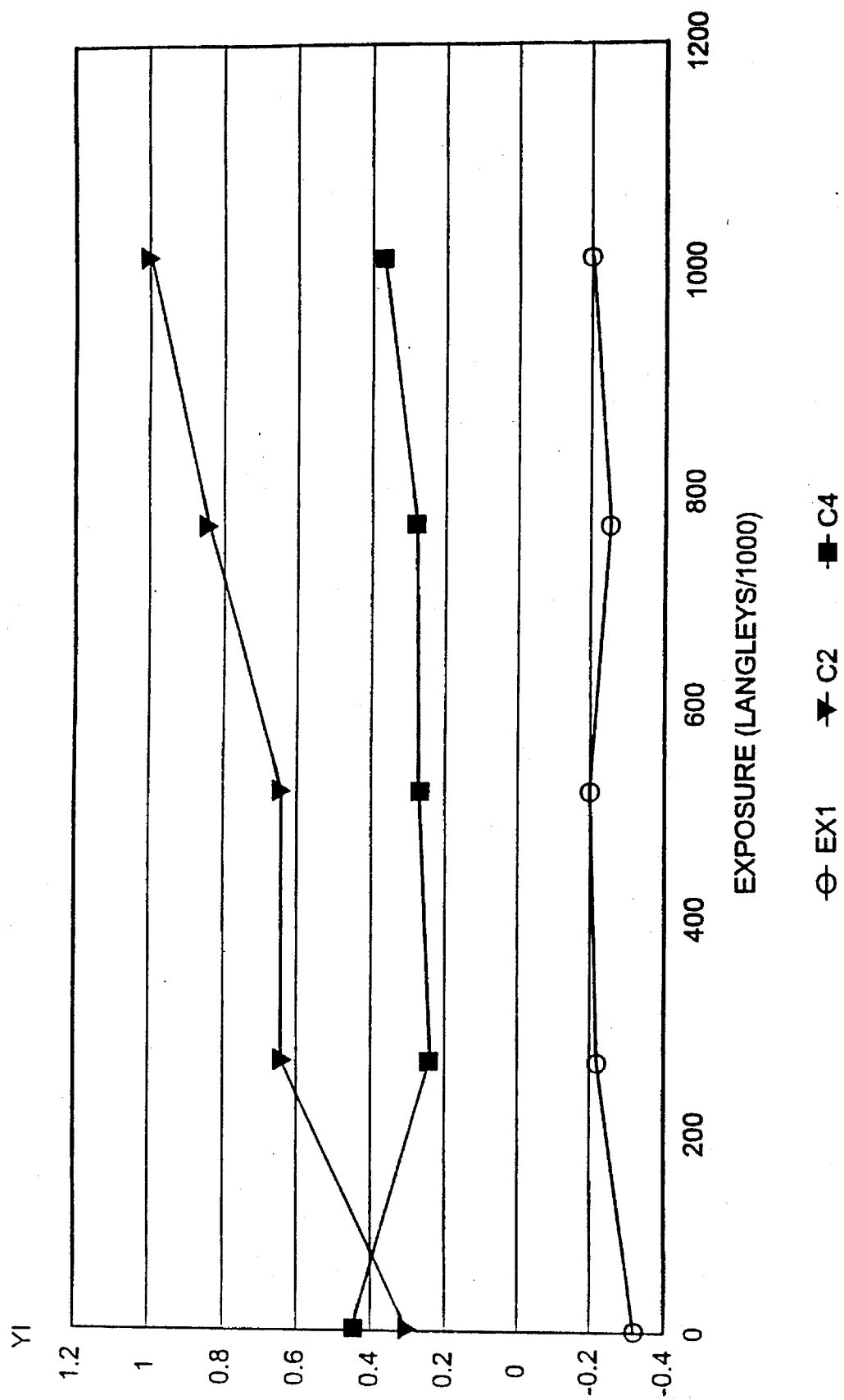
Figure 2:
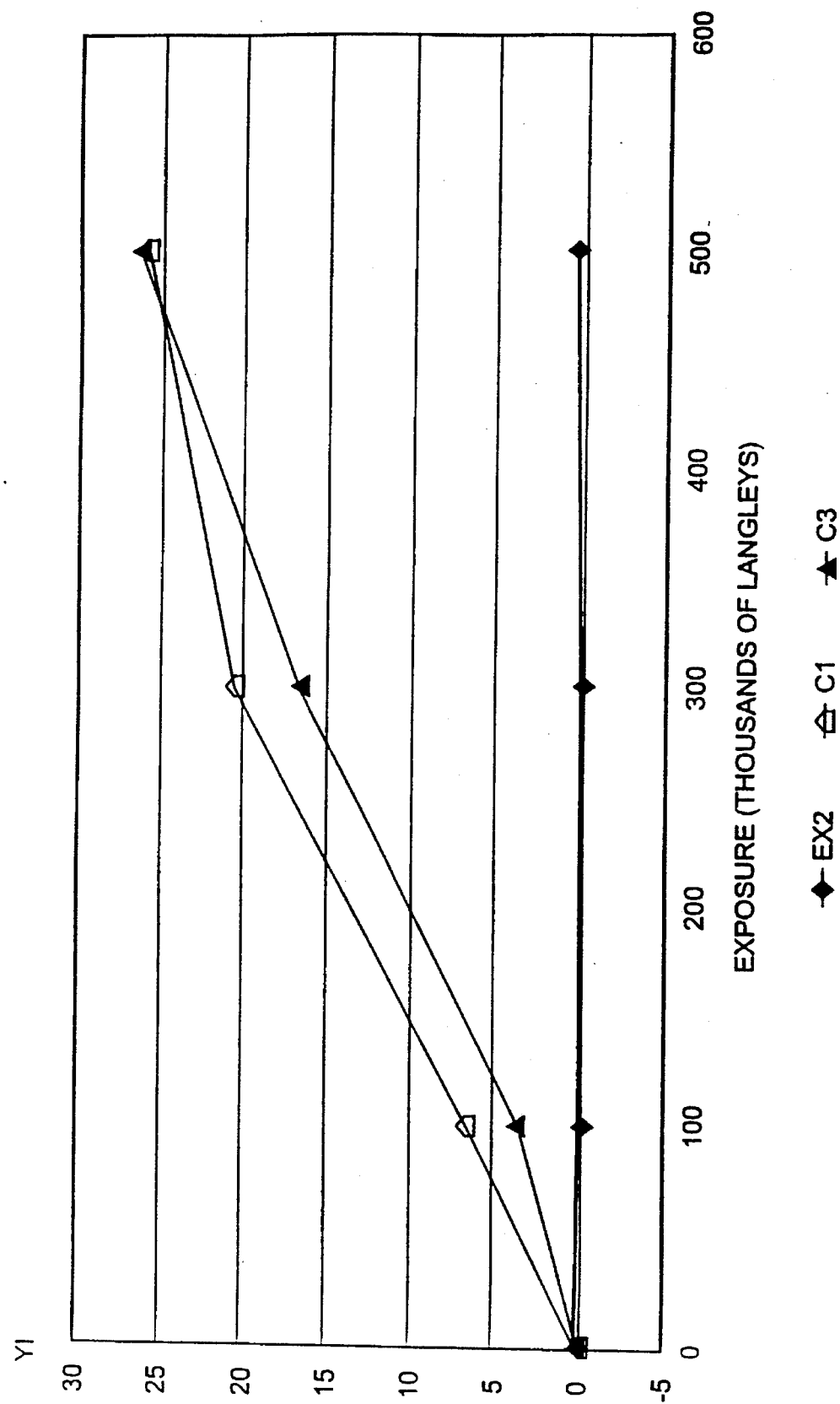

In describing the invention, reference will be made to the accompanying drawings wherein FIGS. 1 and 2 are plots of PVB sheet yellowness containing various UV absorbers versus time of exposure to UV light.

DETAILED DESCRIPTION OF THE INVENTION

The ACA in the UV-stabilized sheet of the invention is predominantly a multivalent, preferable divalent, metal salt of a $C_1$ to $C_8$ organic, preferably aliphatic, monocarboxylic acid in which the metal cation is typically magnesium, calcium or zinc. Mixtures of such salts can be used. Representative anions are acetate, butyrate, substituted buryrates such as 2-ethyl butyrate, octanoate etc. Magnesium 2-ethyl butyrate is preferred. Such multivalent metal salts in the formulation of the sheet control its adhesion to glass and importantly maintain it within a desired range over a broad range of moisture levels in the sheet which can be as high as about 2 weight %. Monovalent metal salt may be present in the sheet usually as a result of carryover from the process step of neutralizing acid catalyst used in acetalizing polyvinyl alcohol (PVOH) to form the PVB resin. Potassium acetate is typically used in such neutralization and remains trapped in the resin after drying. Such monovalent salt in the sheet affects adhesion the same as does the multivalent species but is more sensitive to moisture than the latter. For the moisture insensitivity desired, the amount of multivalent metal salt in the sheet formulation should be such as to provide at least 3 EDTA titer units (defined hereafter). The total concentration of ACA in the sheet is generally about 0.01 to 0.1 (preferably 0.01 to 0.05) weight percent based on PVB resin.

PVB resin has a weight average molecular weight greater than 70,000, preferably about 100,000 to 250,000, as measured by size exclusion chromatography using low angle laser light scattering. On a weight basis PVB typically comprises less than 19.5%, preferably about 17 to 19% hydroxyl groups calculated as polyvinyl alcohol (PVOH); 0 to 10%, preferably 0 to 3% residual ester groups, calculated as polyvinyl ester, e.g. acetate, with the balance being acetal, preferably butyraldehyde acetal, but optionally including a minor amount of acetal groups other than butyral, for example 2-ethyl hexanal as disclosed in U.S. Pat. No. 5,137,954, issued Aug. 11, 1992.

PVB resin is produced by known aqueous or solvent acetalization processes reacting PVOH with butyraldehyde in the presence of acid catalyst, followed by neutralization of the catalyst, separation, stabilization and drying of the resin. It is commercially available from Monsanto Company as Butvar® resin.

The PVB resin of the sheet is typically plasticized with about 20 to 80 and more commonly 25 to 45 parts plasticizer per hundred parts of resin. Plasticizers commonly employed are esters of a polybasic acid or a polyhydric alcohol. Suitable plasticizers are triethylene glycol di-(2-ethylbutyrate), triethyleneglycol di-(2-ethylhexanoate), tetraethyleneglycol diheptanoate, dihexyl adipate, dioctyl adipate, mixtures of heptyl and nonyl adipates, dibutyl sebacate, polymeric plasticizers such as the oil-modified sebacic alkyds, and mixtures of phosphates and adipates such as disclosed in U.S. Pat. No. 3,841,890 and adipates and alkyl benzyl phthalates as disclosed in U.S. Pat. No. 4,144,217. Also mixed adipates made from $C_4$ to $C_9$ alkyl alcohols and cyclo $C_4$ to $C_{10}$ alcohols as disclosed in U.S. Pat. No. 5,013,779. $C_6$ to $C_8$ adipate esters such as hexyl adipate are preferred plasticizers.

The amount of UV absorber corresponding to formula (1) can vary and is generally from 0.1 to 1 part per 100 parts PVB.

In addition to plasticizer, UV absorber in accordance with formula (1) above, and ACA, PVB sheet may contain other performance-enhancing additives such as pigments or dyes for coloring all or part of the sheet, antioxidants and the like.

Sheet is prepared by combining UV-absorber, ACA and plasticizer, then mixing with PVB resin and forcing the mixture under pressure through a die opening to form the sheet. Thickness is typically about 0.13 to 1.3 mm to provide adequate impact absorption in the glass laminate.

Glass laminates using sheets of the invention are prepared by known procedures. The PVB sheet is interposed between glass layers (or assembled with a single glass layer) and then the assembly is subjected in an autoclave to about 90° to 165° C. at a pressure of about 1034 to 2067 kPa for at least ten minutes to tightly bond the layers and form the safety glass laminate.

The following Examples illustrate and do not limit or restrict the invention. Amounts and percentages are in weight.

Properties reported in Examples are measured substantially in accordance with the following procedures.

Yellowness Index (YI) ASTM D1925. The higher the value the greater the yellowness.

EDTA (ethylene diamine tetra acetic acid) Titer—measures multivalent (not monovalent) carboxylic acid metal salt concentration in the sheet. 1 EDTA titer unit equals 25.4 parts magnesium 2-ethyl butyrate (Mg2EB) per million parts of PVB resin. Dissolve 7 gm of plasticized PVB sheet in methanol. Add 12 to 15 mls of Buffer 10 solution (ammonium chloride/ammonium hydroxide) and 12 to 15 drops of Erichrome Black T indicator in methanol. Before titrating adjust % transmission on a light meter to about 80%. The sample turns bright magenta pink with addition of the Erichrome Black T. When titration is complete the solution is deep indigo blue. One EDTA titer unit equals $1 \times 10^{-7}$ mole multivalent metal salt per gm PVB.

EMMA Exposure—ASTM D4364. EMMA is a registered trademark of DSET Laboratories. This procedure describes use of Fresnel-reflective concentrators to measure accelerated outdoor weathering in Arizona using concentrated natural sunlight. Exposure is measured in Langleys where 1 Langley =0.04184 MJ/m$^2$.

EXAMPLES 1, 2 and C1–C4

A) This shows the moisture-tolerance of multi(di)valent carboxylic acid metal salt adhesion control agent.

PVB sheet plasticized with dihexyl adipate and containing 380 parts magnesium 2-ethyl butyrate (multivalent salt) per million parts PVB resin at a water content of 0.2% and 2% is conventionally laminated between two glass layers and sheet adhesion to glass measured at −18° C. using the pummel adhesion (PA) test. In this test the glass laminates are pummeled with a 1 pound (454 g) ballpeen hammer to break the glass and broken glass unadhered to the PVB layer removed. Glass left adhered is visually compared to a set of standards of known pummel scale, the higher the number of the standard, the more glass remaining adhered to the sheet—i.e. at a pummel of zero, no glass is left whereas at a pummel of 10, 100% of the interlayer surface is adhered to glass. Good impact dissipation is correlatable with a pummel adhesion value of about 2 to 7. At less than 2, too much glass is lost whereas at more than 7 adhesion is too high. PA is 7 at 0.2% water and 6 at 2% water. In comparison, PA's at the same (0.2 and 2%) sheet moisture using monovalent metal salt solely i.e. potassium acetate (KOAc) are respectively 7 and 0. This supports relative insensitivity to moisture of multivalent metal carboxylic acid salt ACA.

B) Sheet UV tolerance. PVB sheet containing 32 phr dihexyl adipate plasticizer, an effective adhesion control level of magnesium 2-ethyl butyrate and various benzotriazole UV stabilizers/absorbers were laminated between two layers of float glass and subjected to exposure in accordance with ASTM D 4364 for varying time periods. UV stabilizers in each formulation are at the same molar level. Exposure results are depicted in FIGS. 1 and 2. Details of the formulations are in Table 1. Examples C1 through C4 are not according to the invention, though for convenience in analysis, structural groups for the benzotriazoles of such control examples are identified with the same $R_1$ and $R_2$ nomenclature used in invention Examples 1 and 2 and shown in Formula (1) above. Samples with negative YI appear bluish in color which comes from the bluish hue associated with clear glass.

TABLE 1

| Example | $R_1$ | $R_2$ | STABILIZER Moles | phr | EDTA Titer |
|---|---|---|---|---|---|
| 1[1] | C(CH$_3$)$_2$CH$_2$CH$_3$ | C(CH$_3$)$_2$CH$_2$CH$_3$ | 0.01 | 0.8 | 16.3 |
| 2[2] | C$_{12}$H$_{25}$ | CH$_3$ | 0.01 | 0.9 | 15.1 |
| C1[3] | H | CH$_3$ | 0.01 | 0.5 | 9.1 |
| C2[4] | C(CH$_3$)$_3$ | CH$_3$ | 0.01 | 0.2 | 11.0 |
| C3[5] | H | C(CH$_3$)$_2$(CH$_2$)$_4$CH$_3$ | 0.01 | 0.7 | 13.6 |
| C4[6] | H | CH$_3$ | 0.01 | 0.2 | 0 |

[1]Tinuvin 328 from Ciba Geigy
[2]Tinuvin 571 from Ciba Geigy
[3]Tinuvin P from Ciba Geigy
[4]Tinuvin 326 - contains chlorine atom on triazole ring i.e. 2-(3'-tert-butyl-2' hydroxy-5'-methylphenyl)-5-chlorobenzotriazole
[5]Cyasorb UV 5411 from Cytec Industries
[6]Tinuvin P using KOAc ACA From the above exposure data YI for Controls C1, C2 and C3 relatively rapidly increases (C2 at 1M and C1 and C3 over 0.5M Langleys) in comparison with Exs. 1 and 2. YI at an exposure level of 1 ML is considered representative of long term performance of a laminate containing a particular UV stabilizer. Controls C1–C3 are unacceptable in UV stability performance despite the relatively similar structure of the benzotriazole compounds to those of Examples 1 and 2. Yellowness increase in the controls is believed a result of association between the multivalent ACA salt and UV absorber species. This is brought out by C4 showing <0.5 YI after 1M Langleys using only monovalent potassium acetate as ACA. Though Ex. 2 is only exposed to 0.5 L, acceptable performance (<0.5 YI) is predicted at 1M Langleys.

Similar UV performance to that of Exs. 1 and 2 is predicted when $R_1$ is CH$_3$. Though the metal cation in the above Examples is magnesium, similar results are also predicted with other divalent metal cations. Yellowness reduced or avoided by the invention is independent of PVB plasticizer type. Similar acceptable YI to those of Examples 1 and 2 are obtained using other plasticizers—i.e. tetraethyleneglycol diheptanoate, triethyleneglycol diheptanoate and triethyleneglycol di-2-ethylhexanoate.

We claim:

1. Polyvinyl butyral sheet containing multivalent metal salt and a UV stabilizing amount of a benzotriazole-based compound having the formula:

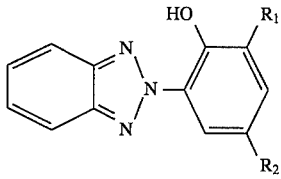

wherein $R_1$ denotes $CH_3$, linear or branched $C_5$ alkyl or linear or branched $C_{12}$ alkyl and $R_2$ denotes $CH_3$ or linear or branched $C_5$ alkyl.

2. The sheet of claim 1 wherein the salt is divalent.

3. The sheet of claim 2 wherein $R_1$ and $R_2$ are $C_5$ linear alkyl.

4. The sheet of any of claims 1, 2 or 3 wherein the amount of the compound is 0.1 to 1 parts by weight per 100 parts polyvinyl butyral.

5. Polyvinyl butyral sheet containing multivalent metal salt and a UV light absorber consisting of a compound having the formula:

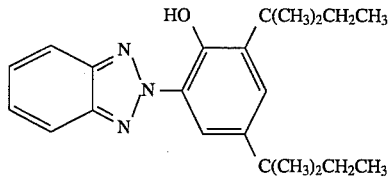

* * * * *

UNITED STATES PATENT AND TRADEMARK OFFICE
CERTIFICATE OF CORRECTION

PATENT NO. : 5,618,863
DATED : April 8, 1997
INVENTOR(S) : D'Errico, et al

It is certified that error appears in the above-indentified patent and that said Letters Patent is hereby corrected as shown below:

On the title page, item

[56] REFERENCES CITED

Attorney, Agent, Or Firm

"Fitzpatrick, Cella Harper & Scinto" should read --Fitzpatrick, Cella, Harper & Scinto--.

COLUMN 1

Line 25, "Multivalentmetal" should read --Multivalent metal--.
Line 56, "DRAWING" should read --DRAWINGS--.

COLUMN 4

Line 60, "Species." should read --species.--.

Signed and Sealed this

Eleventh Day of November, 1997

Attest:

BRUCE LEHMAN

Attesting Officer   Commissioner of Patents and Trademarks